(12) United States Patent
Porter et al.

(10) Patent No.: US 8,009,679 B2
(45) Date of Patent: Aug. 30, 2011

(54) COMMUNICATION SYSTEM AND METHOD

(75) Inventors: John David Porter, Cambridgeshire (GB); Richard Mark Barden, Cambridge (GB)

(73) Assignee: Cambridge Broadband Networks Limited

( * ) Notice: Subject to any disclaimer, the term of this patent is extended or adjusted under 35 U.S.C. 154(b) by 73 days.

(21) Appl. No.: 12/093,222

(22) PCT Filed: Nov. 8, 2006

(86) PCT No.: PCT/GB2006/004180
§ 371 (c)(1),
(2), (4) Date: Jan. 6, 2009

(87) PCT Pub. No.: WO2007/054695
PCT Pub. Date: May 18, 2007

(65) Prior Publication Data
US 2009/0141649 A1      Jun. 4, 2009

(30) Foreign Application Priority Data

Nov. 10, 2005  (GB) .................................. 0522987.7
Apr. 12, 2006  (GB) .................................. 0607374.6

(51) Int. Cl.
*H04L 12/56* (2006.01)
*H04L 12/28* (2006.01)
(52) U.S. Cl. .................................. 370/395.6; 370/395.1
(58) Field of Classification Search ........................ None
See application file for complete search history.

(56) References Cited

U.S. PATENT DOCUMENTS

| | | | | |
|---|---|---|---|---|
| 5,790,552 A | * | 8/1998 | Proctor et al. | 370/466 |
| 6,529,512 B1 | * | 3/2003 | Galand et al. | 370/400 |
| 6,633,566 B1 | * | 10/2003 | Pierson, Jr. | 370/395.1 |
| 2002/0176422 A1 | * | 11/2002 | Shirasaki | 370/395.1 |
| 2005/0100056 A1 | * | 5/2005 | Chuberre et al. | 370/532 |
| 2005/0117610 A1 | * | 6/2005 | Chevallier et al. | 370/521 |
| 2006/0239269 A1 | * | 10/2006 | Moldestad et al. | 370/395.5 |

FOREIGN PATENT DOCUMENTS

GB          2 276 518           9/1994
WO     WO2004/110000        12/2004

OTHER PUBLICATIONS

The ATM Forum Technical Committee, Circuit Emulation Service Interoprability Specification, Version 2.0, af-vtoa-0078.000, pp. 1-93, Jan. 1997.

* cited by examiner

*Primary Examiner* — Ricky Ngo
*Assistant Examiner* — Clemence Han
(74) *Attorney, Agent, or Firm* — Fish & Richardson P.C.

(57) ABSTRACT

In a communications system a transmitter is arranged to transmit asynchronous transfer mode (ATM) cells in which synchronous transfer mode (STM) channels are assembled. In order to minimize the bandwidth required at lease some of the ATM cells include one or more switch command(s) (12) that indicate a change in the activation state of one or more STM channels (11-0 to 11-n).
The switch commands (12) and STM channels (11) fill the ATM cell from opposite ends of the cell.
Activate switch commands comprise two bytes, a high byte including a pointer (18) pointing to the start of a block of STM channels (11) and a low byte that includes a pointer (19) that points to the channel within a block of STM channels (11) to which the switch command applies.

92 Claims, 8 Drawing Sheets

ATM cell with switch commands, carrying an E1 frame

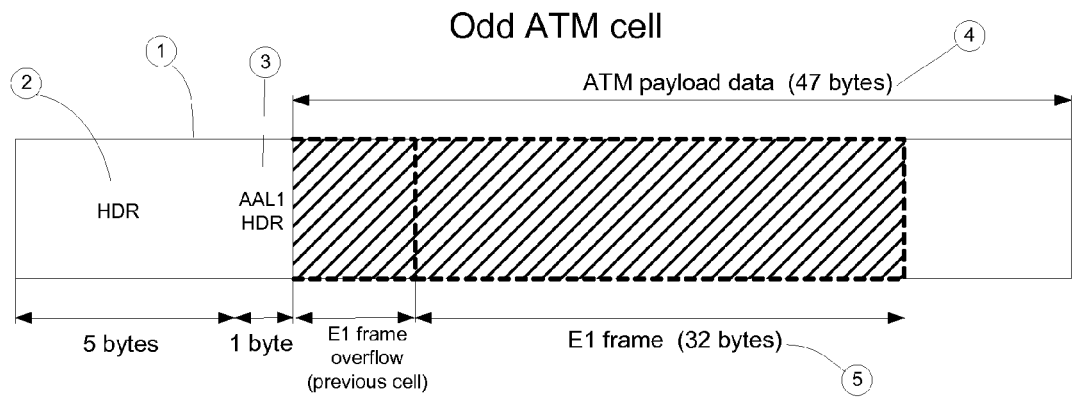
Figure 1(a) Odd-numbered ATM cell carrying an E1 frame (PRIOR ART)
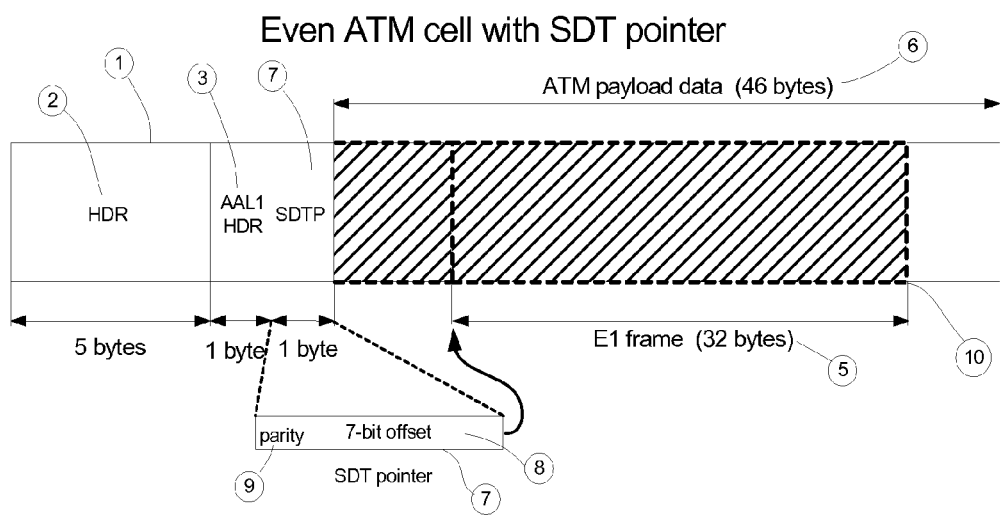
Figure 1(b) Even-numbered ATM cell with SDT pointer, carrying an E1 frame (PRIOR ART)

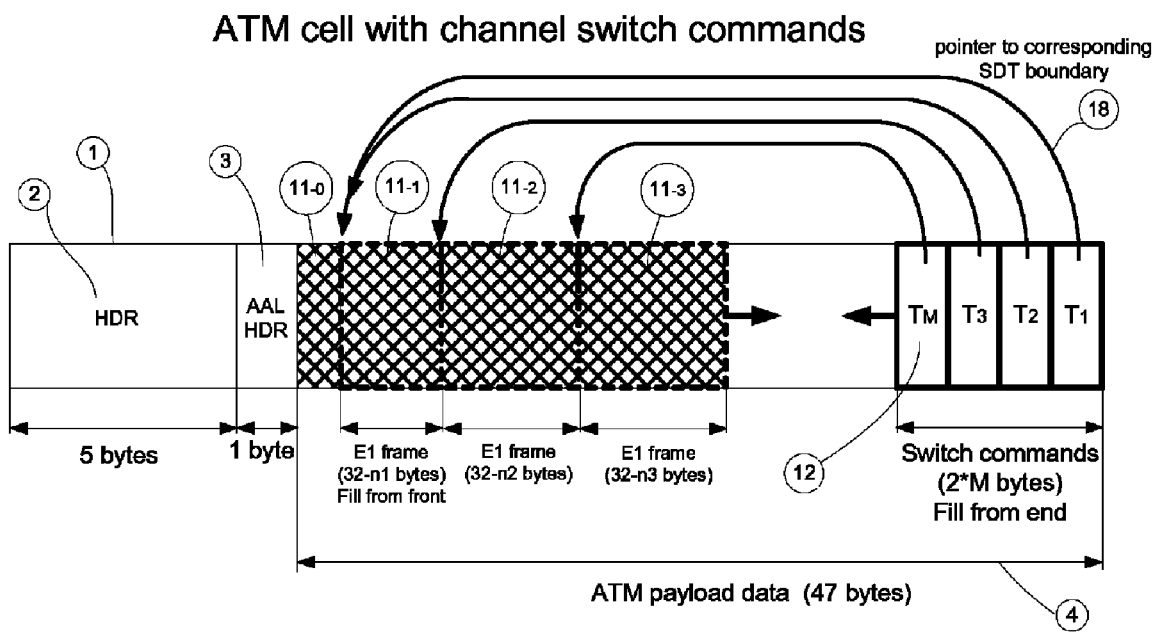
Figure 2 - ATM cell with switch commands, carrying an E1 frame

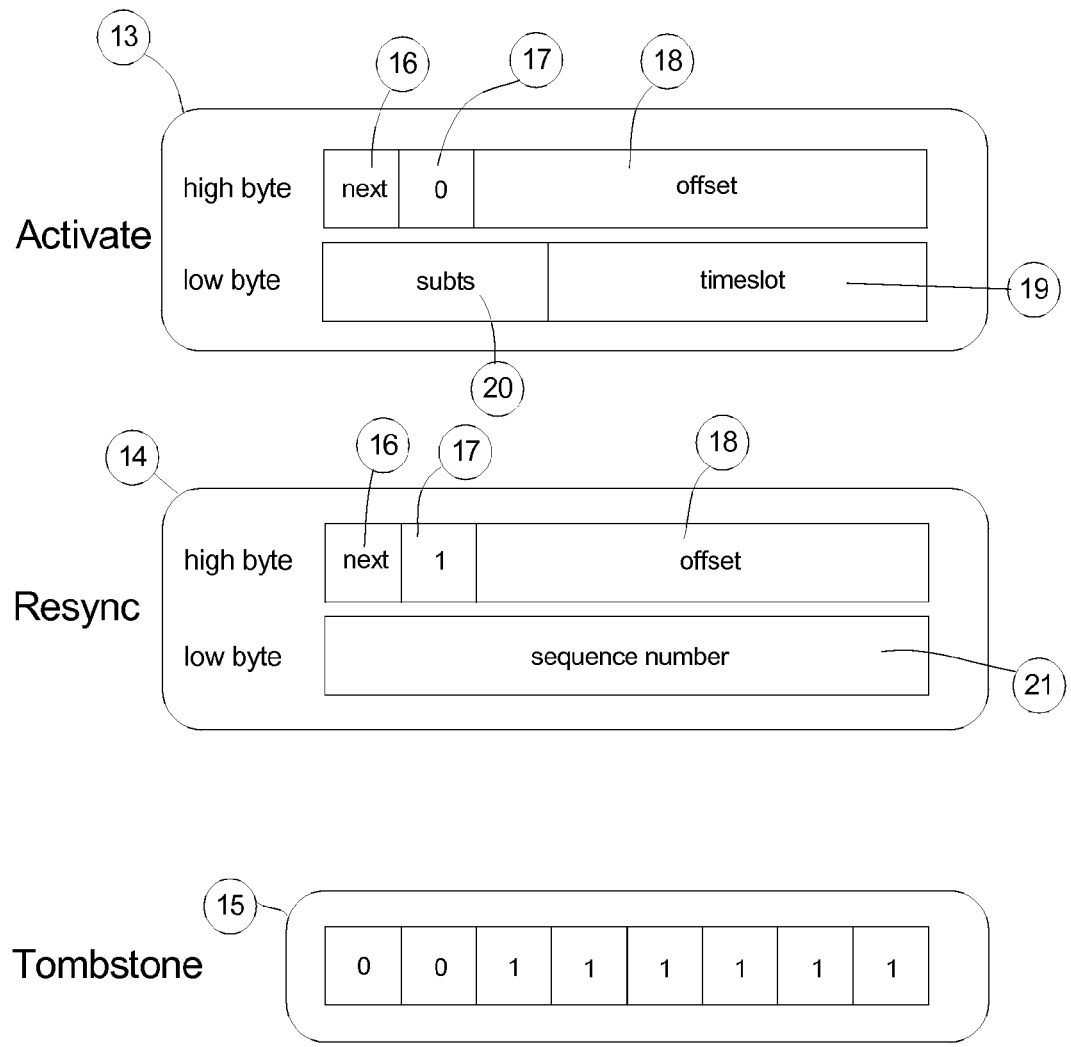
Figure 3 – Types of switch command

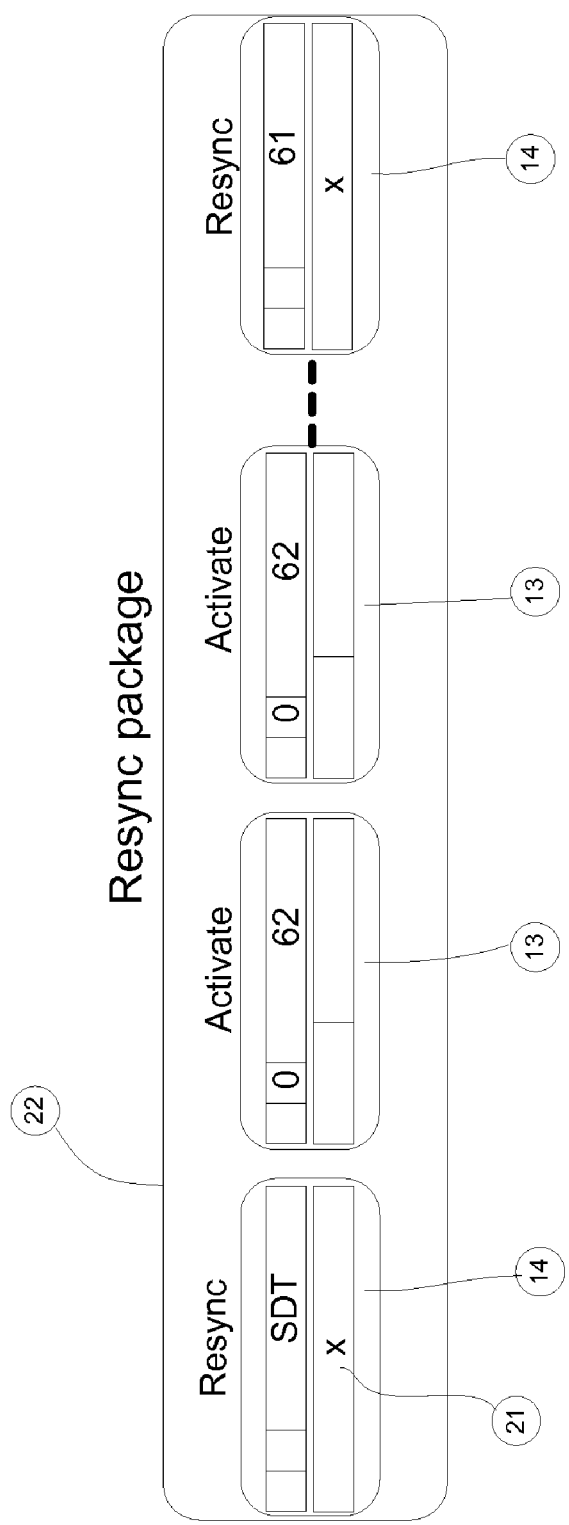
Figure 4 - Package of Resync commands

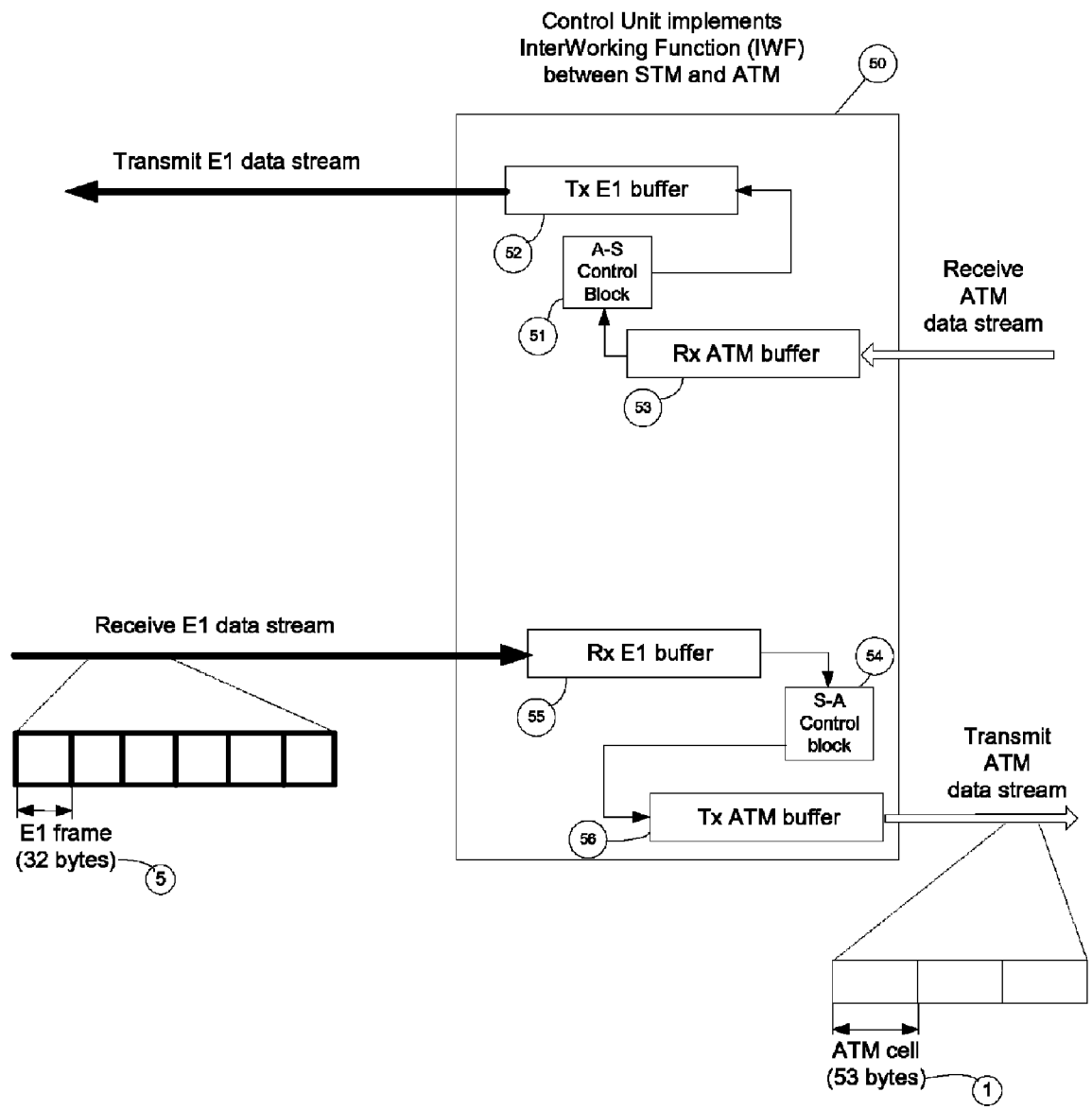
Figure 5 - Control Unit implementing IWF between STM and ATM

COMMUNICATION SYSTEM AND METHOD

CROSS-REFERENCE TO RELATED APPLICATIONS

This application is a 371 application of, and claims priority to, International Patent Application Serial No. PCT/GB2006/004180, filed Nov. 8, 2006, which claims priority to United Kingdom Patent Application No. 0607374.6, filed Apr. 12, 2006, and United Kingdom Patent Application No. 0522987.7, filed Nov. 10, 2005. The disclosures of the prior applications are considered part of, and are incorporated by reference in, the disclosure of this application.

TECHNICAL FIELD

The invention relates to a communications system and to a method of communication especially, but not exclusively, to circuit emulation services (CES) over an asynchronous transfer mode (ATM) network. Additionally, this invention relates to multi-user telecommunications systems such as fixed wireless access (FWA), which use ATM as the transport protocol.

BACKGROUND

A communications network carries information among a number of locations. It consists of nodes connected by links carrying information between them. Rather than have a separate set of wires or separate radio channel for each voice or data conversation, time-division multiplexing (TDM) may be used. For example, ITU-T G.704 consists of 32 channels of 64 kbps, making up 2.048 Mbps. To meet increasing demand for bandwidth, ITU-T G.702 describes the pleisiochronous digital hierarchy (PDH), in which the basic G.704 links are joined together using bit-stuffing to synchronise them. The basic 2.048 Mbps link is known as "E1", and the hierarchy is based on multiples of four E1, for example, E2 is made up of four E1s and offers 8 Mbps bandwidth. Since E1 is a synchronous TDM link, a channel that has been set up between two users is dedicated until the connection is torn down. Also, dropping and inserting traffic into a PDH link requires a full set of demultiplexers to separate the data stream into individual E1s. Synchronous Digital Hierarchy (SDH) has capability for bandwidth on demand, and is made up of multiples of E1. Both PDH and SDH are circuit-based digital networks, and are referred to as synchronous transfer mode (STM).

Growth in the use of computers has led to the development of packet-based networks. In a packet-based network, the stream of data is split up into packets at the entrance to the network, and is re-assembled at the destination. A packet-based call does not require a dedicated circuit through the network, so allowing packets from one call to be inserted in-between packets from many other calls. Thus packet-based networks can utilise network bandwidth more efficiently than circuit-based networks, and so are better suited to carrying bursty data traffic. Asynchronous transfer mode (ATM) uses fixed-length packets (ATM cells) which allows switching of packets in hardware, resulting in higher speeds than is possible with Ethernet. ATM is very flexible, enabling transmission of different media types such as voice, video and data. It allows dedicated circuits to be set up simultaneously with different bandwidths and Quality of Service (QoS), with high priority and low priority traffic. ATM works in connection-oriented mode, so guaranteeing correct cell-sequencing for packets in a given connection. There are five classes of QoS, Class 0 (always guaranteed), Class 1 (CES and constant bit rate), Class 2 (variable bit rate audio and video), Class 3 (connection-oriented frame relay) and Class 4 (connectionless data transfer such as IP and SMDS).

However, packet-based networks usually do not work well for time-critical applications such as voice, because the packets may experience delay variations whilst travelling through the network. As a result, packets are not received at a constant bit rate, and this has a significant impact on the quality of time-critical connections, such as a telephone call. To allow network operators to carry different applications over a single network, a solution is needed which provides the advantages of both a circuit-based constant bit rate service, and a packet-based, high bandwidth utilisation service.

One approach offered by the ATM Forum, is circuit emulation service (CES) over ATM, described in; "Circuit Emulation Service Interoperability Specification", Version 2.0, January 1997, AF-VTOA0078.000, available for download from http://www.atmforum.com, the contents of which are hereby incorporated by reference. CES over ATM establishes a logical path through the ATM network. In this respect, CES over ATM is similar to time-division multiplexing (TDM) in that all data follows the same path from one point to another in the network, and so packets should be received in the correct order. An ATM path can accommodate multiple circuits. Depending on the data rate needed for a given circuit, different bit rates can be assigned to different circuits using the same path, so providing a variety of service levels to different users, and allowing greater control over delay variations.

The ATM Adaptation Layer (AAL) converts data from higher-level formats such as X.25, Ethernet, and STM into ATM cells and back again. Within AAL, the convergence sublayer (CS) and segmentation and reassembly sublayer (SAR) take care of applications that require constant bit rate (CBR) and variable bit rate (VBR). ATM Adaptation Layer AAL 1 is used by CES, which requires a very low cell transfer delay and delay variation to carry STM services (for example, streams of E1) over ATM. AAL 1 handles synchronisation, delay jitter, cell loss and wrong cell insertion. The CS and SAR are included in the adaptation layer header, which sits between the ATM cell header and payload data in the ATM cell. When carrying an E1 stream over ATM each E1 frame is smaller than an ATM cell, which means that in order to make full use of the ATM cell payload, E1 frames are subdivided across two ATM cells by the AAL 1 adaptation layer. All ATM cells have a 1-byte AAL 1 header after the ATM cell header, consisting of a 3-bit sequence number, 4-bit cyclic redundancy check (CRC) and 1-bit convergence sublayer indicator (CSI). The CSI bit in odd-numbered cells is used for synchronous residual time stamp (SRTS) synchronisation. Even-numbered ATM cells may also have a structured data transfer (SDT) pointer after the AAL 1 header. The CSI bit in even-numbered ATM cells is set to indicate the presence of an SDT pointer. The SDT pointer points to the first boundary of an E1 frame within the ATM payload, and acts as a check when re-assembling E1 frames. The SDT pointer contains a 7-bit offset having values 0-93 (byte offset split over two ATM cells) or 127 (dummy value), and a parity bit. ATM cells are collected together into a frame of eight cells, and only one SDT pointer is allowed to be active per frame, which makes the system slow to switch channels on and off.

Since E1 is a circuit-based service, it must continue to send data (even if the circuit is idle), until the connection is torn down. When carrying E1 over ATM, however, it is possible to save transmission bandwidth by leaving out any idle channels of the E1 stream. Information about which channels are active at any particular time, may be obtained from the signalling channel, or else by monitoring the E1 channels individually.

ATM Forum specification "(DBCES) Dynamic Bandwidth Utilization in 64 KBPS Time Slot Trunking Over ATM—Using CES", July 1997, AF-VTOA0085.000, available for download from http://www.atmforum.com, the contents of which are hereby incorporated by reference and also UK patent GB 2276518A, "Statistical gain using ATM signalling" describe a method of saving bandwidth when carrying STM over ATM. This method uses an ATM Adaptation Layer 1 (AAL 1) format that additionally includes a map indicating which STM channels are idle, the idle channels not being transmitted in the ATM cells, and this is achieved using a busy-map for each set of eight ATM cells. The busy-map is a field of length 1-byte up to 4 bytes, which has a 1-bit marker for each of the transmitted timeslots of the E1 bearer (up to 31 timeslots). The marker bit is set if the corresponding timeslot is busy. The length of the frame can be calculated by adding up the number of set bits in the busy-map, and the busy and idle bytes can be sorted using the pattern of bits in the busy-map. This method uses 4 octets (bytes) per frame, which is an overhead. If a cell containing the busy-map is lost, then the following cell may have to be discarded. The damage will extend from the lost cell through to the frame beginning after the next busy-map.

Drawbacks of the busy-map system are as follows:
(a) For data with rapid fluctuations from busy to idle, the busy-map is slow-reacting because it can only be updated at most once per ATM frame (that is eight ATM cells, or a minimum of twelve E1 frames). It is inefficient because it cannot change configuration quickly enough to delete E1 channels that become idle in-between busy-maps.
(b) A more serious problem is that if a channel changes from idle to busy, then there is no way of transmitting the data for that channel until the next busy-map, so resulting in lost data. This is less critical for voice trunking, but limits use for other data applications. The delay in switching on channels is at least twelve E1 frames (12× 125 microseconds), equal to 1.5 milliseconds. Thus the busy-map bandwidth utilisation system is lossy, and this can only be overcome by inserting a prohibitively large number of busy-maps.

Therefore, an improved method is desirable for carrying TDM traffic (such as E1) over ATM, which is both more efficient and less lossy.

SUMMARY

In wireless networks, radio spectrum is a scarce resource, and so it is important to use bandwidth as efficiently as possible.

In a first aspect the invention provides a communications system comprising a transmitter, a receiver, and a transmission medium between the transmitter and the receiver, the transmitter being arranged to transmit asynchronous transfer mode (ATM) cells in which synchronous transfer mode (STM) channels are assembled; wherein at least some of the ATM cells include a switch command, the switch command indicating a change in the activation state of an STM channel.

This gives the advantage that the state of an STM channel can be changed from idle to busy or busy to idle in the same ATM cell as the change occurs, assuming that the number of STM channels changing state is not too large. Consequently the chance of information being lost as an STM channel changes state from idle to busy is reduced compared with the busy map arrangement of the prior art. In addition since only changes in the state of a channel are signalled the overhead entailed in the signalling of the STM channel state is reduced when changes are less frequent.

When more than one STM channel in an ATM cell changes activation state a corresponding number of switch commands may be included in the ATM cell.

When no STM channel in an ATM cell changes activation state no switch commands are included in the ATM cell.

STM channels and switch commands may fill the ATM cell from opposite ends of the cell. This enables the switch commands to be packed in consecutive blocks allowing ATM cells to be utilised efficiently.

The convergence sublayer indicator (CSI) bit in each ATM cell may be used to indicate the presence of switch commands in the cell. This enables the presence of switch commands with an ATM cell to be identified, so that a receiver may be monitor the state of the STM channels and perform the unpacking of the STM channels correctly.

The switch commands may comprise two bytes, the first including a pointer pointing to the start of a block of STM channels and the second including a pointer pointing to the channel within the block of STM channels to which the switch command applies.

The first byte may further include a bit indicating whether any further switch commands are present in the ATM cell. This enables the presence of any further switch commands to be identified if the bit is set and indicates that no further switch commands are present in the ATM cell when the bit is cleared.

The second byte may further include data indicating whether an STM channel comprises a number of sub channels and if so to which sub channel the switch command applies. In this way STM channels using fewer than eight bits can share an ATM byte and may use one, two, or four bits of a byte.

In one embodiment the switch command may include a third byte, the third byte including one or more error detection/correction bits for detecting/correcting errors in the data in the first and/or second bytes.

A resynchronisation command may be sent at desired intervals, the resynchronisation command carrying sufficient information to enable the receiver to check the current activation state of all the STM channels.

By sending resynchronisation commands at regular intervals it is possible to correct and update the information at the receiving end should switch commands be lost due to loss or corruption of ATM cells containing switch commands.

The resynchronisation command may comprise a first command indicating that resynchronisation instructions are being transmitted, a series of switch commands, one for each active STM channel, and a final command indicating that the resynchronisation instructions are complete.

Alternatively, the resynchronisation command may comprise a first command indicating that resynchronisation instructions are being transmitted, a series of switch commands, one for each inactive STM channel, and a final command indicating that the resynchronisation instructions are complete.

The resynchronisation command may include error detection and/or correction.

Thus it is possible to determine whether there are any errors in the resynchronisation commands and possibly to correct certain of the errors. Error detection/correction codes will be known to the person skilled in the art.

A switch command for an inactive channel may include a third byte that indicates the value to be assigned by the receiver to that idle channel.

This can be used to correct the value assigned to an idle channel at the receiver if that information had become corrupted.

A system may comprise first and second terminals, each comprising a transmitter and a receiver, and a transmission medium between the transmitters and receivers, each transmitter being arranged to transmit asynchronous transfer mode (ATM) cells in which synchronous transfer mode (STM) channels are assembled; wherein at least some of the ATM cells include a switch command, the switch command indicating a change in the activation state of an STM channel.

The switch commands produced by the first and second transmitters may be independent of each other.

Thus, for duplex communication each transmitter may be arranged to transmit only active channels of the STM signal with the respective receivers receiving switch commands from the transmitter together with the STM channels in the ATM cells.

In a second aspect the invention provides a transmitter arranged to transmit asynchronous transfer mode (ATM) cells in which synchronous transfer mode (STM) channels are assembled; wherein at least some of the ATM cells include a switch command, the switch command indicating a change in the activation state of an STM channel.

In a third aspect the invention provides a receiver for receiving asynchronous transfer mode (ATM) cells in which synchronous transfer mode (STM) channels are assembled; wherein at least some of the ATM cells include a switch command, the switch command indicating a change in the activation state of an STM channel and wherein the receiver is arranged to detect from the switch commands those STM channels that are active and to assemble the STM channels from successive ATM cells.

In a fourth aspect the invention provides a communications method comprising the steps of;
packing a synchronous transfer mode (STM) frame comprising a plurality of channels into asynchronous transfer mode (ATM) cells for transmission,
inserting a switch command indicating whether a single STM channel is active or inactive into each ATM cell in which the activation state of an STM channel changes or a preceding ATM cell;
transmitting the ATM cells including the switch commands, and
on reception of the ATM cells using the switch command to enable the unpacking of the STM channels from the ATM packets.

In a fifth aspect the invention provides a method of transmitting asynchronous transfer mode (ATM) cells in which synchronous transfer mode (STM) channels are assembled comprising the step of including a switch command in at least some of the ATM cells, the switch command indicating a change in the activation state of an STM channel.

In a sixth aspect the invention provides a method of receiving synchronous transfer mode (STM) channels assembled in asynchronous transfer mode (ATM) cells at least some of the ATM cells including a switch command, the switch command indicating a change in the activation state of an STM channel the method comprising the steps of;
detecting from the switch commands those STM channels that are active, and
assembling the STM channels from successive ATM cells using the state of the STM channels derived from the switch commands.

Preferred, optional, and alternative features of the invention are set forth in the dependent claims to which reference should now be made.

DESCRIPTION OF DRAWINGS

The above and other features and advantages of the invention will be apparent from the following description, by way of example, of an embodiment of the invention with reference to the accompanying drawings, in which:

FIG. 1 is a diagram showing E1 frames carried over ATM, using the ATM Forum specification AF-VTOA0078.000 for use in prior art communication systems, FIG. 1(a) showing an odd-numbered ATM cell carrying E1 frames and FIG. 1(b) showing an even-numbered ATM cell with an SDT pointer showing the boundary of the E1 frame;

FIG. 2 is a diagram of an ATM cell for use in a communication system according to the invention including variable-length E1 frames and switch commands to indicate those E1 timeslots whose activation state is inverted;

FIG. 3 is a diagram showing the format of different switch commands for use in an embodiment of a communications system according to the invention;

FIG. 4 is a diagram showing the structure of a package of Resync commands for use in an embodiment of a communications system according to the invention;

FIG. 5 is a block schematic diagram of an embodiment of a control unit for use in an embodiment of a transceiver in a communications system according to the invention to implement the InterWorking Function mapping STM frames to ATM cells;

DETAILED DESCRIPTION

Figure 6:
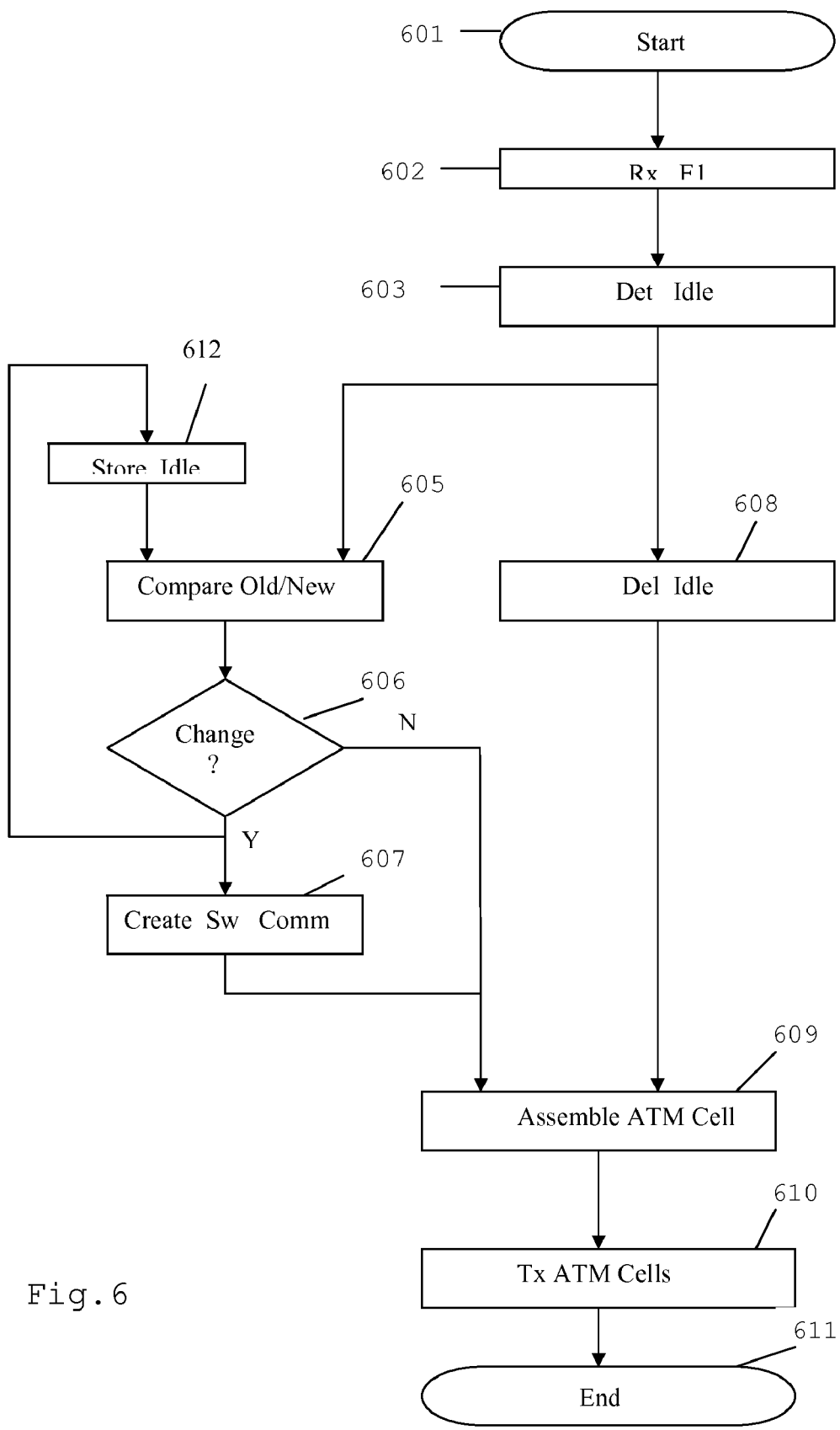
FIG. 6 is a flow diagram illustrating the assembly of STM channels and switch commands into ATM cells for transmission.

FIG. 1 shows the standard CES AAL structure when carrying E1 frames over ATM. In FIG. 1(a), an odd-numbered ATM cell 1 is shown. The standard ATM cell starts with a 5-byte ATM cell header 2, followed by a 1-byte AAL header 3, which contains the CSI bit. A 32-byte E1 cell 5 is packed into the 47-byte ATM data payload 4. FIG. 1(b) shows an even-numbered ATM cell 1, which includes a SDT pointer 7. The SDT pointer includes a 7-bit offset 8, pointing to the boundary 10 of the E1 cell 5. The SDT pointer 7 also includes a parity bit 9 to check for bit errors The shortened ATM data payload 6 is only 46 bytes long. The presence of the SDT pointer is indicated by setting the CSI bit in the AAL 1 header 3, but this bit may only be set once in every frame of eight ATM cells.

In one embodiment of the invention where bi-directional communication is provided, the dynamic bandwidth optimisation protocol functions in each direction (upstream and downstream), independently. Each end decides which timeslots to send, but is told which timeslots to receive by switch commands embedded inband in the virtual circuit (VC). These switch commands allow any data channel (8-bit, 4-bit, 2-bit or 1-bit) to be turned on or off within the same STM frame.

The AAL ATM cell structure of the present invention is shown in FIG. 2.

The ATM cell 1 begins with a 5-byte header 2 that is the same as the header of the ATM cell of FIG. 1, and is followed by a modified AAL header 3 in which the CSI bit is used to indicate the presence of switch commands 12, that is the bit is set when a switch command is present in the cell and cleared when no switch commands are present. There are M switch commands, where M is the total number of E1 channels that change state in the E1 frames contained in the ATM cell, and q whole E1 frames, carried in a particular ATM cell. If, for example, all 31 E1 channels were active in the previous E1 frame, and in the current frame $n_1$ channels become idle, then these $n_1$ channels are omitted from the E1 frame, resulting in a shorter E1 frame 11-1 packed into the ATM data payload 4. To achieve this, $p_1$ switch commands 12 need to be inserted, starting from the end of the ATM cell. In this example, $n_1=p_1$, but in general this will not be the case. The value $n_1$ is the number of inactive E1 channels (from 0-31) in an E1 frame, and the value $p_1$ is the number of E1 channels that is changed state from the previous E1 frame. Since the number of active channels is, usually, smaller than thirty two it may be possible to pack a plurality of E1 frames, in the case of the example three E1 frames 11-1, 11-2, and 11-3 having $32-n_1$, $32-n_2$, and $32-n_3$, E1 channels, respectively, into an ATM cell. Also E1 frames may be spread between adjacent ATM cells, in this case the end of an E1 frame 11-0 carried over from the previous ATM cell is shown.

Each switch command comprises 2 bytes. Typically most E1 frames will not have any channels changing state, so no switch commands will be needed, thus M=0 for most ATM cells. There will be savings in bandwidth whenever N>2M, where $N=n_1+n_2+n_3+\ldots+n_q$ and $M=p_1+p_2+p_3+\ldots+p_q$ and q is the number of E1 frames in that particular ATM cell. This means that the system will be most efficient when few E1 channels are active, and they do not change state very often and will become less efficient as the number of active E1 channels increases and with increasing frequency of channel state changes.

The first byte of each switch command contains a pointer to the start of the associated E1 frame and consequently can be used to check synchronisation as well as indicating the E1 frame to which the switch command relates. If two or more STM channels change state in one E1 frame there will be a corresponding number of switch commands all having a pointer to the start of the same E1 frame. This can be seen in FIG. 2 where the pointer from switch commands $T_1$ and $T_2$ both point to the start of E1 frame 11-1, whereas switch command $T_3$ points to the start of E1 frame 11-2 and switch command $T_M$ points to the start of E1 frame 11-3. The particular channel in the E1 frame to which the switch command relates is indicated by data in the second byte. Thus for switch commands relating to different channels in the same E1 frame the pointer will have the same value but the channel data in the second byte of the switch commands will differ.

In a further embodiment the switch commands may comprise three bytes and in this case the third byte may comprise an error detection/correction code for the data in the first two bytes. This offers a more robust approach where the transmission channel may be noisy but at the expense of requiring a greater signalling overhead. The complexity of the error detection/correction code will be dependent on the protection desired and may be provided, for example, as a simple parity check, a Hamming code, or a cyclic redundancy code.

Alternatively, the third byte may give the value to be applied to the idle channel by the receiver. It will be appreciated that an idle channel may have a non-zero value.

The payload data contains STM frames packed sequentially, across ATM cell boundaries if necessary. The switch commands 12 are linked sequences of commands, each usually occupying 2 bytes, and provide dynamic activation/deactivation of an STM channel. The switch commands also provide periodic resynchronisation points to support recovery from loss of AAL synchronisation at the receiver. By causing the payload structure of data and switch commands to fill up from opposite ends of the ATM cell, commands and data can be synchronised. A command activating a channel must be associated with the particular SDT block in which the activation occurs. That is, a switch command must be within the same ATM cell as the E1 frame to which it relates or a preceding ATM cell.

FIG. 3 shows the structure of three types of switch commands: that is an Activate command 13, a Resync command 14 and Tombstone byte 15. In the Activate 13 and Resync 14 commands, the high byte "next" bit 16 is set if there is another switch command after this 2-byte command. The last command in an ATM cell must have the "next" bit 16 unset. A single-byte Tombstone command 15 will only appear as the last byte inserted into the cell (inserted in-between the data bytes and switch commands), and is used to occupy a solitary byte that could not otherwise be used. The six "offset" bits 18 of the high byte point to the byte in the data part of the payload, indicating the start of the SDT block or E1 frame to which this command refers. The byte following the AAL header is referenced as one, so the range of values for "offset" is 1-47, and some reserved values may be utilised for other functions. In the low byte, the five "timeslot" bits 19 indicate the timeslot position within the VC's set of timeslots, so on a particular VC, the upper limit is NSLOTS-1. The relative position definition is necessary to allow timeslots to be mapped differently at the E1 interface at each end. The three "subts" bits 20 are not used for 8-bit operation. For operation with channels smaller than eight bits wide, the "subts" bits 20 are used to identify a particular sub-channel within the timeslot. In the Resync command 14, the low byte consists of an 8-bit "sequence number" 21, which is related to the G.704 frame count on the source E1 interface. Its primary purpose is to allow multiple VC's originating on the same E1 bearer to be resynchronised exactly when recombined. The Activate 13 and Resync 14 switch commands comprise 2 bytes, and cannot be split across ATM cells. Thus in one embodiment if a single byte is empty after the last switch command, it is filled with a 1 byte Tombstone command 15.

Dynamic channel control is achieved by using the Activate command 13 (which is used to either activate or deactivate an individual channel). The high byte offset 18 identifies the start of the SDT block (E1 frame) in which the activation takes effect and the low byte timeslot 19 identifies the channel within the SDT block to which the switch command relates. If all the commands associated with a particular E1 frame 11 cannot be fitted into the same ATM cell 1, then they can be put into the next cell. Commands in the late cell will have "offset" value of zero, since the relevant SDT block may have already started. The next SDT block cannot have any data in the first cell. In this late command case, it is important that any channel value for the SDT block that is associated with the channel of the late command, is in the relevant late cell. That is if a complete E1 frame is contained within an ATM cell all the switch commands must be contained within that cell, but if an E1 frame is split across two ATM cells switch commands relating to the later part of the E1 frame may be in the later ATM cell.

Since the Activate switch commands only indicate that a channel is changing state and not the actual state of the channel any errors in transmission will have a cumulative effect and hence the communication will become less reliable as the number of cells transmitted increases. In order to recover from this state a package of Resync commands 22 is sent, at given time intervals, that contain enough information for the receiver to check the state of active E1 channels, and resynchronise with the transmitter if necessary. This allows recovery from lost cells, or bit errors in the data. The package of Resync commands 22 may span several ATM cells 1, and has a pattern as shown in FIG. 4. The first Resync command 14 has an offset value 18 that identifies the SDT block start, and a sequence number 21 that identifies the G.704 frame count at which the synchronisation snapshot was taken. The number of Activate commands 13 between the Resync commands are chosen to be sufficient to identify all active channels. The Activate commands 13 have an offset value of 62, which distinguishes them from normal dynamic channel control Activate commands and the timeslot values 19 indicate the channels that are active. The final Resync command 14 has an offset value of 61 and is used to terminate the package 22, and has the same sequence number 21 as the first Resync command. An alternative embodiment of the invention includes a cyclic redundancy check (CRC) calculated over the whole of the Resync package, and placed in the sequence number field 21 of the last Resync command 14, thus allowing the receiver to check the Resync package for bit errors.

In a further alternative embodiment, the Resync package may include an Activate command 13 for each channel which is idle, to allow resynchronisation in the event of catastrophic synchronisation failure. This is useful if there are only a small number of idle channels, in which case it requires fewer commands to indicate those channels that are idle than those that are active. When an idle channel is present, the dynamic bandwidth optimisation system will not send that timeslot over the ATM link, and the receiver will continue to insert (play-out) the last active data value into the idle channel position in the output STM data stream. Repeating errors may occur if the receiver is playing-out the wrong value into the idle channel position. A further embodiment uses augmented Activate commands in the Resync package, each augmented Activate command containing a third byte to hold the idle channel data value. This provides a mechanism to check that the receiver is inserting the correct data value corresponding to each idle channel present.

In one embodiment of the invention, frames carried over ATM have channels of 8 bits wide, for example for transporting E1 frames 5. In this case, timeslot byte values are packed into ATM cells 1. Each SDT block contains data from all the active channels in one received G.704 frame. In Activate commands 13, the value of subts 20 is zero (unused). The presence of an Activate command causes the specified channel to invert its activation state (toggle). There is usually a minimum number of timeslots, that are usually kept active, for example 5 out of 31 available timeslots always active. The case of no active timeslots is a special case requiring a mode switch, or it may be avoided by keeping a minimum number of channels active. In a further embodiment, the minimum number of active timeslots is configurable by the user, since it affects packetisation times and medium access control (MAC) efficiency.

In another embodiment of the invention, frames carried over ATM have timeslots divided into channels of 2 bits wide (crumbs), for example for transporting backhaul links for GSM cellular telephony, in particular the GSM full-rate 16 kbps Abis channels. In this mode, G.704 frames are processed 4 at a time. For each 2-bit crumb in the virtual circuit (VC) there are four consecutive 2 bit frames available, which can be re-packed to create a byte holding the values of that crumb in the four frames. Four G.704 frames generate 4 AAL SDT blocks, each of which only contains data from one of the four crumbs for each timeslot, numbered 0 through 3. There is a minimum number of channels kept active for each crumb position, so that no SDT block is ever empty. There are some advantages to be gained by transposing crumb data and watching for inactivity on three consecutive transposed bytes to trigger individual crumb channel deactivation. The first advantage is that if a 16 kbps channel contains a repeating byte pattern, for example an idle pattern or repeating high-level data link control (HDLC) flags, then it will be deactivated. Secondly, if the channel is actually a 64 kbps channel containing a repeating byte pattern, then all four crumbs will trigger deactivation. The third advantage is that GSM idle speech frames and other idle frames in 16 kbps channels can be compressed well. When using timeslots divided into 2-bit crumbs, the subts value of each Activate command is used to indicate which 2-bit crumb is referred to, as shown in Table 1:

TABLE 1

Values of subts in Activate commands for crumb-based protocol

| Value of subts | Action |
|---|---|
| 000 | Switch crumb 0 |
| 001 | Switch crumb 1 |
| 010 | Switch crumb 2 |
| 011 | Switch crumb 3 |
| 100 | Activate whole timeslot |
| 101 | unused |
| 110 | unused |
| 111 | Deactivate whole timeslot |

In Table 1, whole timeslot activation and deactivation are optimisations that can be used when several 2-bit crumbs can be activated or deactivated at the same time. The SDT boundary referenced by a Resync package is always one which lies between a crumb 3 SDT block and a crumb 0 SDT block, so that crumbs occupy the same relative position in both terminating E1 timeslots.

In another embodiment of the invention, frames carried over ATM have timeslots divided into units of 1-bit wide, for example for transporting backhaul links for GSM cellular telephony, in particular the GSM half-rate 8 kbps Abis channels.

In another embodiment, channel switch decisions are made by monitoring activity on individual STM channels on a per-block basis. The size of a block must match the data block size of the external data protocol For example, applications like PBX and GSM are byte-structured, and so activity monitoring must also use a block size of one byte. The activity monitoring algorithm looks ahead by a small number of blocks (for example three blocks). If a channel is currently set as active and three or more consecutive blocks from the same channel have the same value, then an Activate command may be issued to change the state from active to inactive, and vice-versa. If timeslots are smaller than the external block size, then it is necessary to collect full blocks for input to the activity monitoring algorithm. For example if the external data block size is 8-bits, and timeslots are 2-bits wide, then four frames must be collected to make up a single 8-bit block for activity monitoring. The number of consecutive blocks monitored for channel switch decisions is a trade-off between delay and bandwidth optimisation. In a further embodiment, the parameters used for switching decisions are configurable by the user.

FIG. 5 shows, in block schematic form, a Control unit 50 for implementing the InterWorking Function (IWF), which maps STM frames (such as E1 frames 5) to ATM cells 1 on an ATM permanent virtual circuit (PVC), and vice-versa. As shown in FIG. 5 an Rx E1 buffer 55 stores received E1 frames, and acts on instructions from an STM-ATM Control Block 54 to pack the received E1 data into ATM cells 1 which are queued in a Tx ATM buffer 56, for onward transmission. An Rx ATM buffer 53 stores incoming ATM cells 1, and acts on instructions from an ATM-STM Control Block 51 to unpack and re-construct the E1 data stream in a Tx E1 buffer 52.

The control blocks 51 and 54 are suitably formed by programmed digital signal processors comprising a microprocessor and associated data and program memories. The buffers 52, 53, 55 and 56 may conveniently be part of the data memories associated with the processors.

FIG. 6 is a flow diagram illustrating the process followed by the STM-ATM Control Block 54 in assembling E1 frames into ATM cells together with associated switching signals.

The process starts, box 601, with the reception of E1 frames box 602 into the buffer 55. The control block 54 then detects any idle channels within an E1 frame, box 603. If a channel is detected as idle it is compared with the state of that channel stored in an idle store, which is located within the memory in the control block 54, box 605, to see whether the state of the channel has changed, box 606. If the state of the channel has changed, then the idle store is updated, box 612, and also Activate switch commands are generated, box 607. The idle channels are then deleted from the E1 frame, box 608, and the remaining channels of the E1 frame together with the switch commands, if any, are assembled into an ATM cell, box 609. The ATM cells are then transmitted, box 610, and the process ends, box 611. In the arrangement shown in FIG. 5, the control block 54 and buffers 55 and 56 may be implemented using a microprocessor and associated data and program memories. The buffers 55 and 56 will use part of the associated data memory as will the memory for storing those E1 channels that are idle. The processor will be programmed to provide the functions shown in the flow diagram of FIG. 6, the program being stored in the program memory associated with the microprocessor, the microprocessor and associated memory forming the control block 54.

As described earlier Resynchronisation commands are sent periodically so that the correct information in the receiver with respect to which STM channels are idle can be maintained. It will be appreciated that since for normal transmissions only changes in the state of any particular channel are transmitted, it is possible that if ATM cells are not received or are corrupted the wrong information about idle channels may be retained in the receiving apparatus. In order to overcome this problem Resynchronisation commands are sent at regular intervals.

Figure 7:
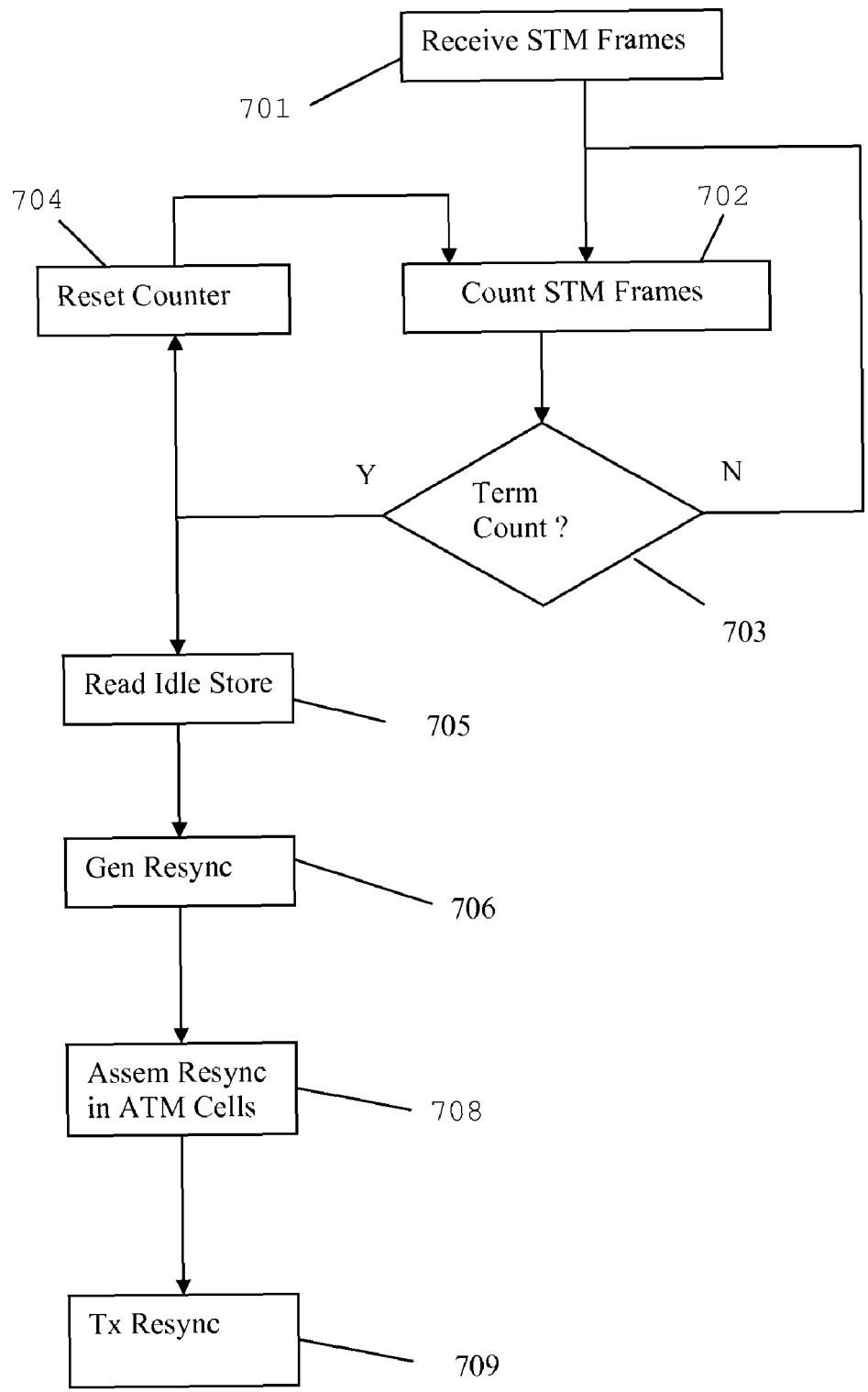
FIG. 7 is a flow diagram illustrating the assembly of Resync commands at intervals into ATM cells.

In order to produce these resynchronisation pulses, the routine shown in FIG. 7 is followed by the control block 54. As E1 frames are received, box 701, they are counted, box 702, and a decision is reached as to whether or not they have reached a terminal count, box 703. If the terminal count has been reached a reset counter command is issued, box 704, and the counter is reset to a desired value. If the terminal count has not being reached then counting of E1 frames is continued. When the terminal count is reached the idle store is read, box 705, and a Resynchronisation command is generated which comprises a Re-sync command a number of activate commands being numbered depending on the number of idle channels and a final Re-sync command as described earlier. The Re-sync commands are assembled into ATM cells, box 708, and the ATM cells containing the Re-sync commands are transmitted, box 709.

Figure 8:
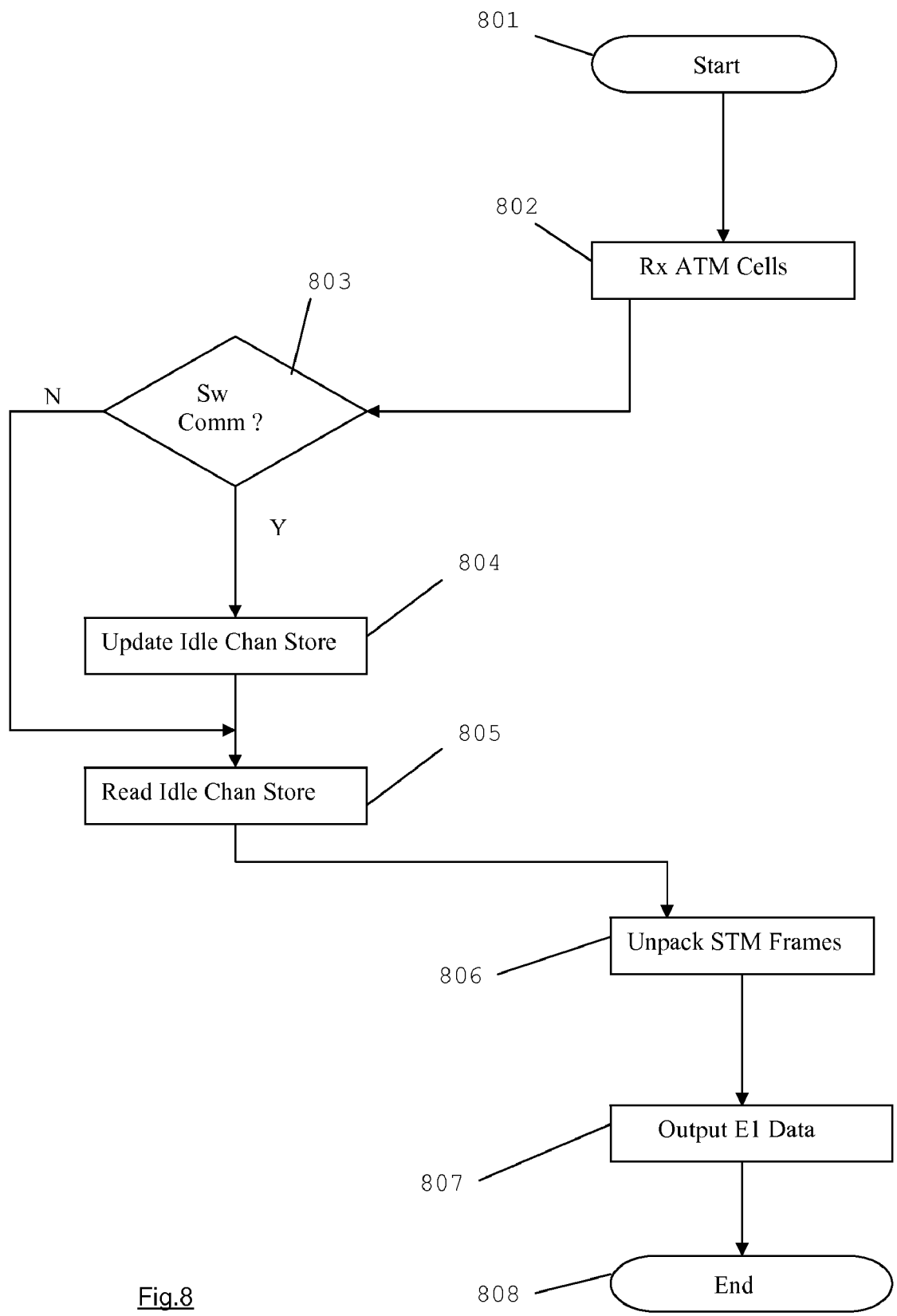
FIG. 8 is a flow diagram illustrating the unpacking of STM channels from received ATM cells.

FIG. 8 is a flow diagram illustrating the process carried out in the control block 51 and buffers 52 and 53 when receiving an ATM data stream and converting it to an E1 data stream. The process starts, box 801, with the reception of ATM cells into the ATM buffer 53, box 802. The control block 51 then inspects the ATM cells and makes a decision as to whether or not the ATM cells contain any switch commands, box 803. If there are switch commands then the control block 51 updates an idle channel store, box 804.

The idle channel store contains information as to whether a particular E1 channel is currently active or idle and, if the channel is idle, the value to be assigned to that E1 channel at the receiver when unpacking the ATM cell. It Will be appreciated that an idle channel is representing a constant value that is not necessarily zero and that different idle channels may have different values.

The constant value may be stored by monitoring the value of each active channel and storing this value until the next E1 frame is received. The stored value is then overwritten with the new value if the channel remains active or is transferred to the idle channel store if the channel becomes inactive as part of the process of updating the idle channel store.

As has been discussed earlier the resynchronisation sequences may also include the value to be assigned to idle channels to enable the value stored within the idle channel store to be checked and corrected if necessary.

The idle channels stored in the idle channel store are then accessed, box 805, and used to enable the control block 51 to unpack the E1 frames from the ATM cells, box 806. The E1 frames are then transferred to the buffer 52, box 807, for output to a desired destination.

It will be apparent that both normal Activate commands and Re-sync commands will be detected by the control block 51. The only difference between their treatments is that the re-sync command will fully update the idle channel store whereas the Activate commands will only update the single channel in the idle channel store to which that Activate command relates.

The invention claimed is:

1. A communications system comprising
a transmitter,
a receiver, and
a transmission medium between the transmitter and the receiver,
the transmitter being arranged to transmit asynchronous transfer mode (ATM) cells in which synchronous transfer mode (STM) channels are assembled; wherein at least some of the ATM cells include a switch command,
the switch command indicating a change in an activation state of an STM channel, the switch command comprising two bytes,
a first byte including a pointer pointing to the start of a block of STM channels, and
a second byte including a pointer pointing to the channel within the block of STM channels to which the switch command applies.

2. The system as claimed in claim 1 in which when more than one STM channel in an ATM cell changes activation state, a corresponding number of switch commands are included in the ATM cell.

3. The system as claimed in claim 1 in which when no STM channel in an ATM cell changes activation state, no switch commands are included in the ATM cell.

4. The system as claimed in claim 1 in which the STM channels and switch commands fill an ATM cell from opposite ends of the ATM cell.

5. The system as claimed in claim 1 in which a convergence sublayer indicator (CSI) bit in each ATM cell is used to indicate a presence of switch commands in the ATM cell.

6. The system as claimed in claim 1 in which the first byte further includes a bit indicating whether any further switch commands are present in that ATM cell.

7. The system as claimed in claim 1 in which the second byte further includes data indicating whether an STM channel comprises a number of sub channels and if so to which sub channel the switch command applies.

8. The system as claimed in claim 1 in which the switch command comprises three bytes, a third byte including one or more error detection/correction bits for detecting/correcting errors in data in the first or second byte.

9. The system as claimed in claim 1 in which a resynchronisation command is sent at desired intervals, the resynchronisation command carrying sufficient information to enable the receiver to check a current activation state of all the STM channels.

10. The system as claimed in claim 9 in which the resynchronisation command comprises a first command indicating that resynchronisation instructions are being transmitted, a series of switch commands, one for each active STM channel, and a final command indicating that the resynchronisation instructions are complete.

11. The system as claimed in claim 9 in which the resynchronisation command comprises a first command indicating that resynchronisation instructions are being transmitted, a series of switch commands, one for each inactive STM channel, and a final command indicating that the resynchronisation instructions are complete.

12. The system as claimed in claim 11 in which a switch command for an inactive channel includes a third byte that indicates a value to be assigned by the receiver to that idle channel.

13. The system as claimed in claim 9 in which the resynchronisation command includes error detection or correction, or both error detection and correction.

14. The system as claimed in claim 13 in which the error detection/correction comprises a cyclic redundancy check code.

15. The system as claimed in claim 1 comprising means for monitoring three or more consecutive bytes in each STM channel and for initiating a switch command for that channel indicating that the channel is now inactive if it was previously active and a value of the consecutive bytes has not changed.

16. The system as claimed in claim 1 comprising means for monitoring bytes in each STM channel and for initiating a switch command for that channel indicating that the channel is now active if it was previously inactive and a current byte value has changed.

17. The system as claimed in claim 1 comprising means for maintaining a desired minimum number of channels active.

18. The system as claimed in claim 17, in which the desired minimum number is user selectable.

19. The system as claimed in claim 1 comprising first and second terminals, each comprising a transmitter and a receiver, and a transmission medium between the transmitters and receivers, each transmitter being arranged to transmit asynchronous transfer mode (ATM) cells in which synchronous transfer mode (STM) channels are assembled; wherein at least some of the ATM cells include a switch command, the switch command indicating a change in the activation state of an STM channel.

20. The system as claimed in claim 19 in which switch commands produced by a first and second transmitters corresponding to the first and second terminals, respectively, are independent of each other.

21. A transmitter arranged to transmit asynchronous transfer mode (ATM) cells in which synchronous transfer mode (STM) channels are assembled; wherein at least some of the ATM cells include a switch command,
the switch command indicating a change in an activation state of an STM channel, the switch command including two bytes,
a first byte including a pointer pointing to the start of a block of STM channels, and
a second byte including a pointer pointing to the channel within the block of STM channels to which the switch command applies.

22. The transmitter as claimed in claim 21 in which when more than one STM channel in an ATM cell changes activation state, a corresponding number of switch commands are included in the ATM cell.

23. The transmitter as claimed in claim 22 in which the STM channels and switch commands fill the ATM cell from opposite ends of the ATM cell.

24. The transmitter as claimed in claim 22 in which each ATM cell includes a convergence sublayer indicator (CSI) bit and the CSI bit in each ATM cell is used to indicate a presence of switch commands in the ATM cell.

25. The transmitter as claimed in claim 21 in which when no STM channel in an ATM cell changes activation state, no switch commands are included in the ATM cell.

26. The transmitter as claimed in claim 21 in which the first byte further includes a bit indicating whether any further switch commands are present in that ATM cell.

27. The transmitter as claimed in claim 21 in which the second byte further includes data indicating whether an STM channel comprises a number of sub channels and if so to which sub channel the switch command applies.

28. The transmitter as claimed in claim 21 in which a resynchronisation command is sent at desired intervals, the resynchronisation command carrying sufficient information to enable a receiver to check a current activation state of all the STM channels.

29. The transmitter as claimed in claim 28 in which the resynchronisation command comprises a first command indicating that resynchronisation instructions are being transmitted, a series of switch commands, one for each active STM channel, and a final command indicating that the resynchronisation instructions are complete.

30. The transmitter as claimed in claim 29 in which a switch command for an inactive channel includes a third byte that indicates a value to be assigned by the receiver to that idle channel.

31. The transmitter as claimed in claim 28 in which the resynchronisation command comprises a first command indicating that resynchronisation instructions are being transmitted, a series of switch commands, one for each inactive STM channel, and a final command indicating that the resynchronisation instructions are complete.

32. The transmitter as claimed in claim 28 in which the resynchronisation command includes error detection or correction, or both error detection and correction.

33. The transmitter as claimed in claim 32 in which the error detection/correction comprises a cyclic redundancy check code.

34. The transmitter as claimed in claim 21, comprising means for monitoring three or more consecutive bytes in each STM channel and for initiating a switch command for that channel indicating that the channel is now inactive if it was previously active and a value of the consecutive bytes has not changed.

35. The transmitter as claimed in claim 21 comprising means for monitoring bytes in each STM channel and for initiating a switch command for that channel indicating that the channel is now active if it was previously inactive and a current byte value has changed.

36. The transmitter as claimed in claim 21 comprising means for maintaining a desired minimum number of channels active.

37. The transmitter as claimed in claim 36 in which the minimum number is user selectable.

38. The receiver for receiving asynchronous transfer mode (ATM) cells in which synchronous transfer mode (STM) channels are assembled;
wherein at least some of the ATM cells include a switch command, the switch command indicating a change in an activation state of an STM channel, the switch command including two bytes,
a first byte including a pointer pointing to the start of a block of STM channels, and
a second byte including a pointer pointing to the channel within the block of STM channels to which the switch command applies; and
wherein the receiver is arranged to detect from the switch command those STM channels that are active and to assemble the STM channels from successive ATM cells.

39. The receiver as claimed in claim 38 in which when more than one STM channel in an ATM cell changes activation state, a corresponding number of switch commands are included in the ATM cell.

40. The receiver as claimed in claim 38 in which when no STM channel in an ATM cell changes activation state, no switch commands are included in the ATM cell.

41. The receiver as claimed in claim 38 in which the STM channels and switch commands fill an ATM cell from opposite ends of the ATM cell.

42. The receiver as claimed in claim 38 in which a convergence sublayer indicator (CSI) bit in each ATM cell is used to indicate a presence of switch commands in the ATM cell.

43. The receiver as claimed in claim 38 in which the first byte further includes a bit indicating whether any further switch commands are present in that ATM cell.

44. The receiver as claimed in claim 38 in which the second byte further includes data indicating whether an STM channel comprises a number of sub channels and if so to which sub channel the switch command applies.

45. The receiver as claimed in claim 38 in which a resynchronisation command is sent at desired intervals, the resynchronisation command carrying sufficient information to enable the receiver to check a current activation state of all the STM channels.

46. The receiver as claimed in claim 45 in which the resynchronisation command comprises a first command indicating that resynchronisation instructions are being transmitted, a series of switch commands, one for each active STM channel, and a final command indicating that the resynchronisation instructions are complete.

47. The receiver as claimed in claim 45 in which the resynchronisation command comprises a first command indicating that resynchronisation instructions are being transmitted, a series of switch commands, one for each inactive STM channel, and a final command indicating that the resynchronisation instructions are complete.

48. The receiver as claimed in claim 47 in which a switch command for an inactive channel includes a third byte that indicates a value to be assigned by the receiver to that idle channel.

49. The receiver as claimed in claim 45 in which the resynchronisation command includes error detection or correction, or both error detection of correction.

50. The receiver as claimed in claim 49 in which the error detection/correction comprises a cyclic redundancy check code.

51. A communications method comprising the steps of:
packing a synchronous transfer mode (STM) frame comprising a plurality of channels into asynchronous transfer mode (ATM) cells for transmission,
inserting into each ATM cell in which an activation state of an STM channel changes, a switch command indicating whether a single STM channel is active or inactive, the switch command including two bytes, a first byte containing an offset value identifying the start of an STM frame in that ATM cell and a second byte identifying the channel within the STM frame to which the switch command corresponds,
transmitting the ATM cells including switch commands, and
receiving the ATM cells, using the switch commands to enable unpacking of the STM channels from ATM cells.

52. The method as claimed in claim 51 comprising the step of, when the activation state of more than one STM channel changes, including a corresponding number of switch commands in that ATM cell, one for each channel changing state.

53. The method as claimed in claim 51 comprising the step of inserting STM channels into an ATM cell starting from one end and inserting the switch commands into an ATM packet starting from another end.

54. The method as claimed in claim 51 in which one of the bytes includes a bit that indicates whether the switch command is the last one within the ATM cell.

55. The method as claimed in claim 51 in which one of the bytes includes three bits identifying a particular bit or combination of bits within the channel identified by the second byte.

56. The method as claimed in claim 51 in which the switch command acts to change the activation state of an STM channel.

57. The method as claimed in claim 51 in which a resynchronisation packages are sent at given intervals, the resynchronisation packages containing sufficient information to identify all currently active channels.

58. The method as claimed in claim 57 in which the resynchronisation package comprises a first resynchronisation command followed by a sufficient number of switch commands to enable all active channels to be identified and terminated by a further resynchronisation command.

59. The method as claimed in claim 51 comprising the further steps of:
monitoring the state of three or more consecutive bytes in each STM channel, and initiating a switch command for that channel indicating that the channel is now inactive if it was previously active and the value of the consecutive bytes has not changed.

60. The method as claimed in claim 51 comprising the further steps of:
monitoring the state of three or more consecutive bytes in each STM channel, and
initiating a switch command for that channel indicating that the channel is now active if it was previously inactive and the value of a current byte has changed.

61. The method as claimed in claim 51 comprising the further step of maintaining a minimum number of STM channels active.

62. The method as claimed in claim 61 in which the minimum number is user programmable.

63. The method of transmitting asynchronous transfer mode (ATM) cells in which synchronous transfer mode (STM) channels are assembled comprising the step of transmitting the ATM cells including a switch command in at least some of the ATM cells, the switch command indicating a change in an activation state of an STM channel, the switch command including two bytes, a first byte including a pointer pointing to the start of a block of STM channels and a second byte including a pointer pointing to the channel within the block of STM channels to which the switch command applies.

64. The method as claimed in claim 63 in which when more than one STM channel in an ATM cell changes activation state, a corresponding number of switch commands are included in the ATM cell.

65. The method as claimed in claim 64 in which the STM channels and switch commands fill the ATM cell from opposite ends of the ATM cell.

66. The method as claimed in claim 63 in which when no STM channel in an ATM cell changes activation state, no switch commands are included in the ATM cell.

67. The method as claimed in claim 63 in which each ATM cell includes a convergence sublayer indicator (CSI) bit and the CSI bit in each ATM cell is used to indicate a presence of switch commands in the ATM cell.

68. The method as claimed in claim 63 in which the first byte further includes a bit indicating whether any further switch commands are present in the ATM cell.

69. The method as claimed in claim 63 in which the second byte further includes data indicating whether an STM channel comprises a number of sub channels and if so to which sub channel the switch command applies.

70. The method as claimed in claim 63 in which a resynchronisation command is sent at desired intervals, the resynchronisation command carrying sufficient information to enable a receiver to check a current activation state of all the STM channels.

71. The method as claimed in claim 70 in which the resynchronisation command comprises a first command indicating that resynchronisation instructions are being transmitted, a series of switch commands, one for each active STM channel, and a final command indicating that the resynchronisation instructions are complete.

72. The method as claimed in claim 71 in which a switch command for an inactive channel includes a third byte that indicates a value to be assigned by the receiver to that idle channel.

73. The method as claimed in claim 70 in which the resynchronisation command comprises a first command indicating that resynchronisation instructions are being transmitted, a series of switch commands, one for each inactive STM channel, and a final command indicating that the resynchronisation instructions are complete.

74. The method as claimed in claim 70 in which the resynchronisation command includes error detection or correction, or both error detection and correction.

75. The method as claimed in claim 74 in which the error detection/correction comprises a cyclic redundancy check code.

76. The method as claimed in claim 63 comprising the further steps of:
monitoring the state of three or more consecutive bytes of each STM channel, and initiating a switch command for that channel indicating that the channel is now inactive if it was previously active and a value of the consecutive bytes has not changed.

77. The method as claimed in claim 63 comprising the further steps of:
monitoring the state of three or more consecutive bytes of each STM channel, and initiating a switch command for that channel indicating that the channel is now active if it was active and a value of a current byte has changed.

78. The method as claimed in claim 63 comprising the further step of maintaining a minimum number of STM channels active.

79. The method as claimed in claim 78 in which the minimum number is programmable.

80. The method of receiving for receiving synchronous transfer mode (STM) channels assembled in asynchronous transfer mode (ATM) cells at least some of which include one or more switch commands, each switch command indicating a change in an activation state of an STM channel and comprising two bytes, a first byte including a pointer pointing to the start of a block of STM channels and a second byte including a pointer pointing to the channel within the block of STM channels to which the switch command applies the method comprising the steps of:
detecting from the switch command those STM channels that are active, and
assembling the STM channels from successive ATM cells using the state of the STM channels derived from the switch commands.

81. The method as claimed in claim 80 in which when more than one STM channel in an ATM cell changes activation state, a corresponding number of switch commands are included in the ATM cell.

82. The method as claimed in claim 80 in which when no STM channel in an ATM cell changes activation state, no switch commands are included in the ATM cell.

83. The method as claimed in claim 80 in which the STM channels and switch commands fill an ATM cell from opposite ends of the ATM cell.

84. The method as claimed in claim 80 in which a convergence sublayer indicator (CSI) bit in each ATM cell is used to indicate a presence of switch commands in the ATM cell.

85. The method as claimed in claim 80 in which the first byte further includes a bit indicating whether any further switch commands are present in that ATM cell.

86. The method as claimed in claim 80 in which the second byte further includes data indicating whether an STM channel comprises a number of sub channels and if so to which sub channel the switch command applies.

87. The method as claimed in claim 80 in which a resynchronisation command is sent at desired intervals, comprising the step of checking a current activation state of all the STM channels, the resynchronisation command carrying sufficient information to enable the method to establish the state of all the STM channels.

88. The method as claimed in claim 87 in which the resynchronisation command comprises a first command indicating that resynchronisation instructions are being transmitted, a series of switch commands, one for each active STM channel, and a final command indicating that the resynchronisation instructions are complete.

89. The method as claimed in claim 87 in which the resynchronisation command comprises a first command indicating that resynchronisation instructions are being transmitted, a series of switch commands, one for each inactive STM channel, and a final command indicating that the resynchronisation instructions are complete.

90. The method as claimed in claim 89 in which a switch command for an inactive channel includes a third byte that indicates a value to be assigned by a receiver to that idle channel, comprising the further step of allocating that value to the received idle channel.

91. The method as claimed in claim 87 in which the resynchronisation command includes error detection or correction, or both detection or correction, the method further comprising the step of checking and/or correcting the resynchronisation command.

92. The method as claimed in claim 91 in which the error detection/correction comprises a cyclic redundancy check code.

* * * * *

UNITED STATES PATENT AND TRADEMARK OFFICE
CERTIFICATE OF CORRECTION

PATENT NO.         : 8,009,679 B2
APPLICATION NO.    : 12/093222
DATED              : August 30, 2011
INVENTOR(S)        : John David Porter et al.

Page 1 of 1

It is certified that error appears in the above-identified patent and that said Letters Patent is hereby corrected as shown below:

Cover page, Column 2, line 4, item (57), (Abstract), delete "lease" and insert --least--.

In Claim 38, Column 15, line 3, delete "The" and insert --A--.

In Claim 49, Column 15, line 64, delete "of" and insert --and--.

In Claim 63, Column 16, line 63, delete "The" and insert --A--.

In Claim 80, Column 18, line 9, delete "The" and insert --A--.

Signed and Sealed this
Sixth Day of December, 2011

David J. Kappos
*Director of the United States Patent and Trademark Office*